Figure 1:
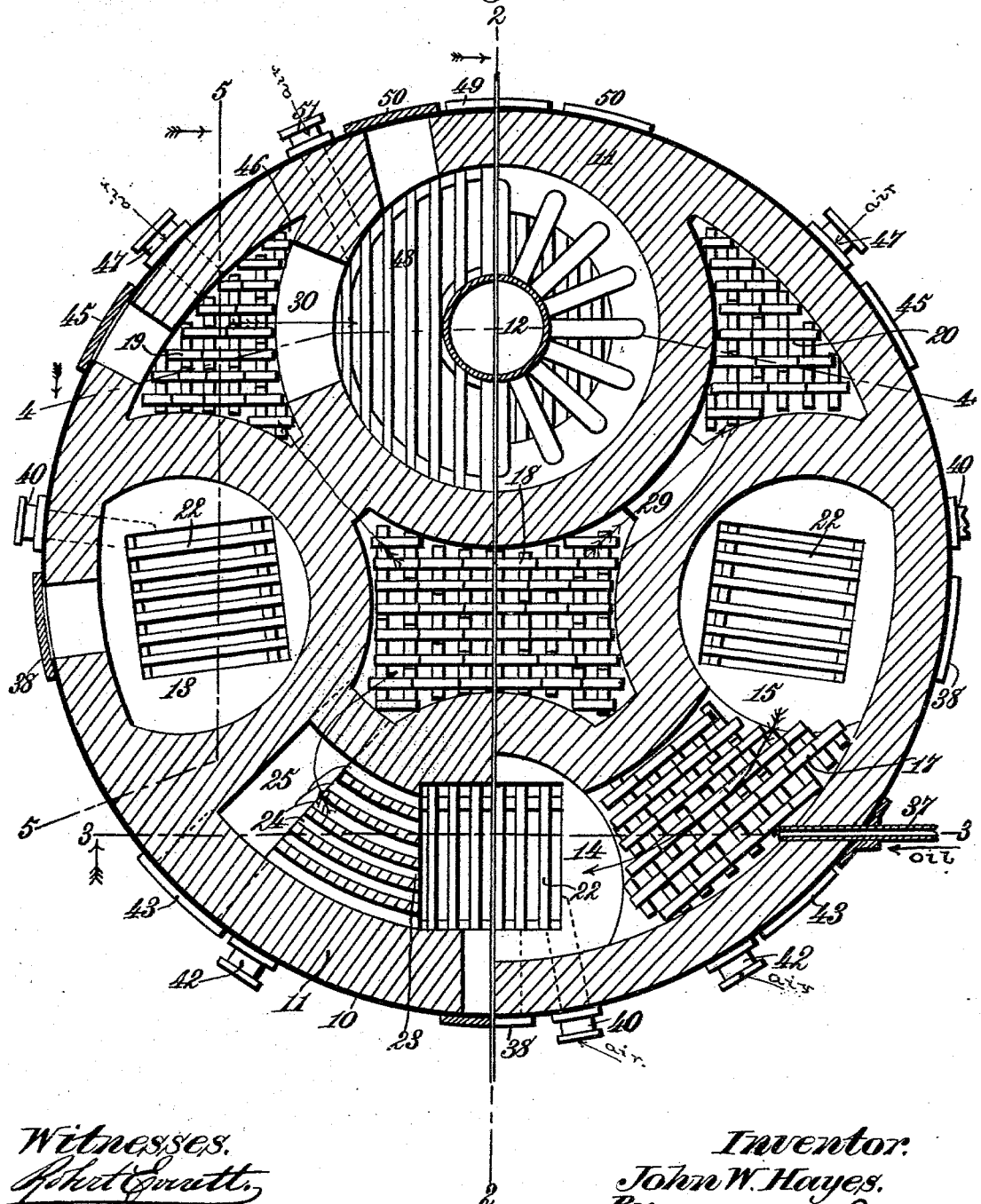

(No Model.) 5 Sheets—Sheet 1.
J. W. HAYES.
APPARATUS FOR THE MANUFACTURE OF GAS.
No. 515,680. Patented Feb. 27, 1894.

Witnesses.
Robert Pruitt,
G. N. Rea.

Inventor:
John W. Hayes.
By James L. Norris
Atty.

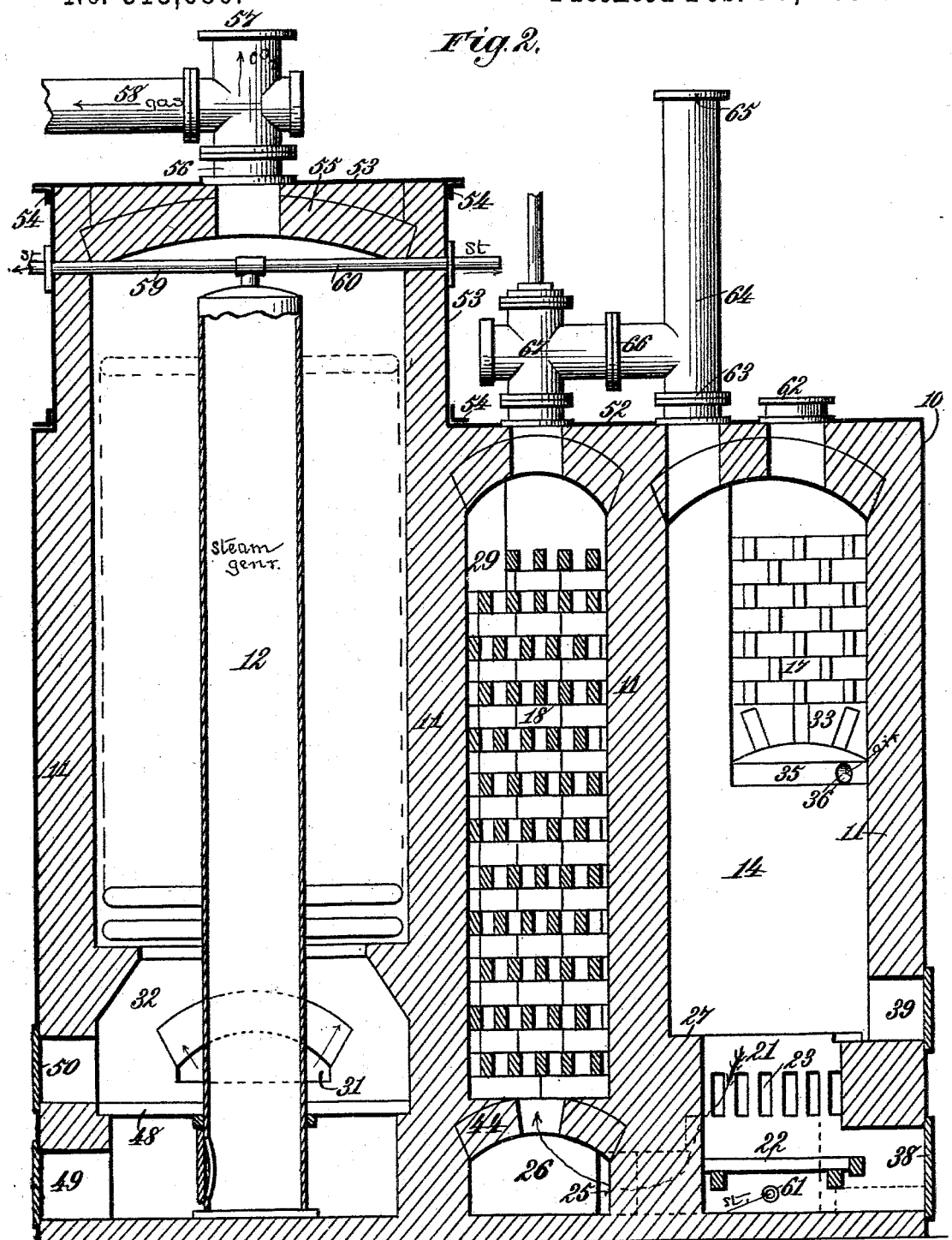

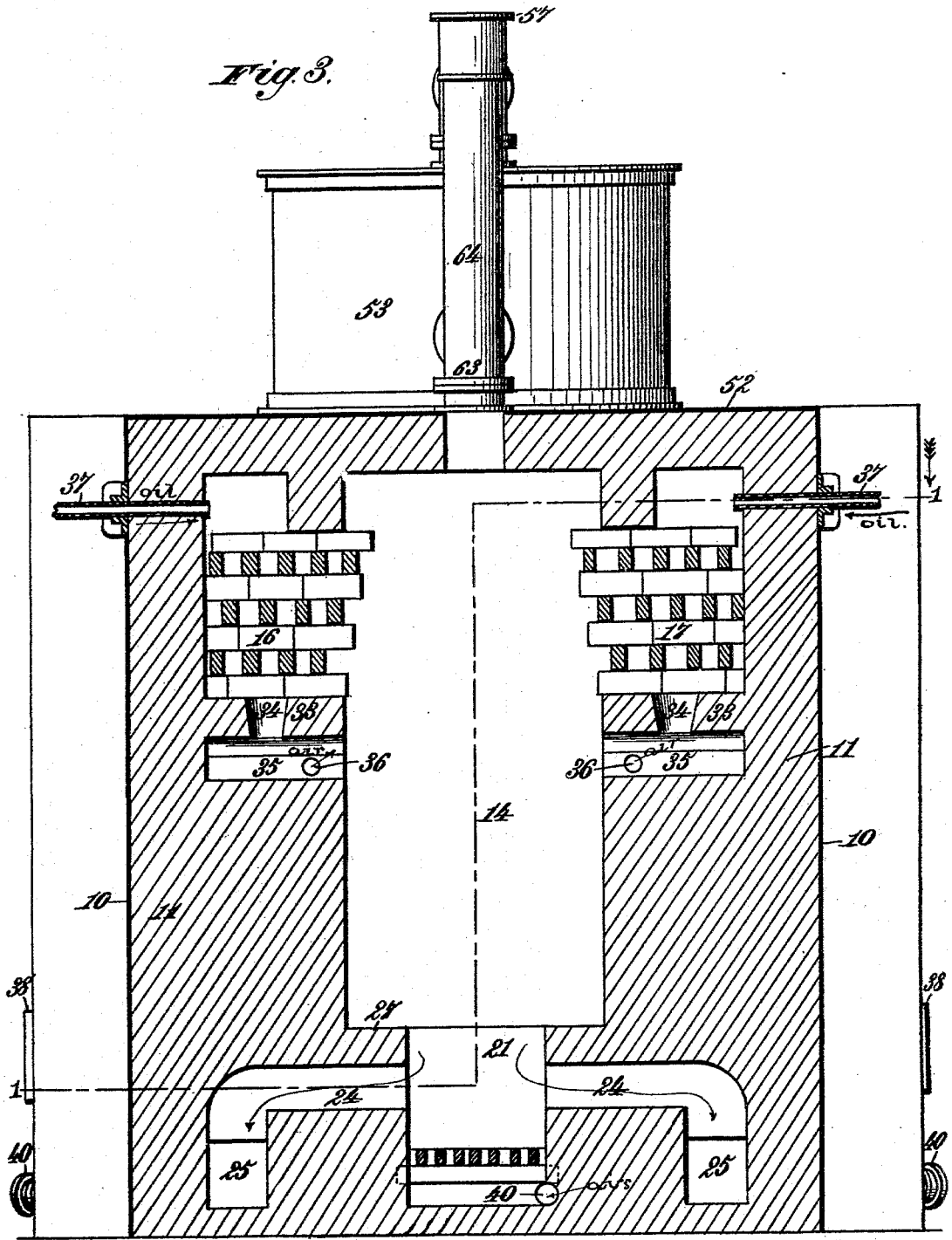

(No Model.) 5 Sheets—Sheet 4.
J. W. HAYES.
APPARATUS FOR THE MANUFACTURE OF GAS.
No. 515,680. Patented Feb. 27, 1894.
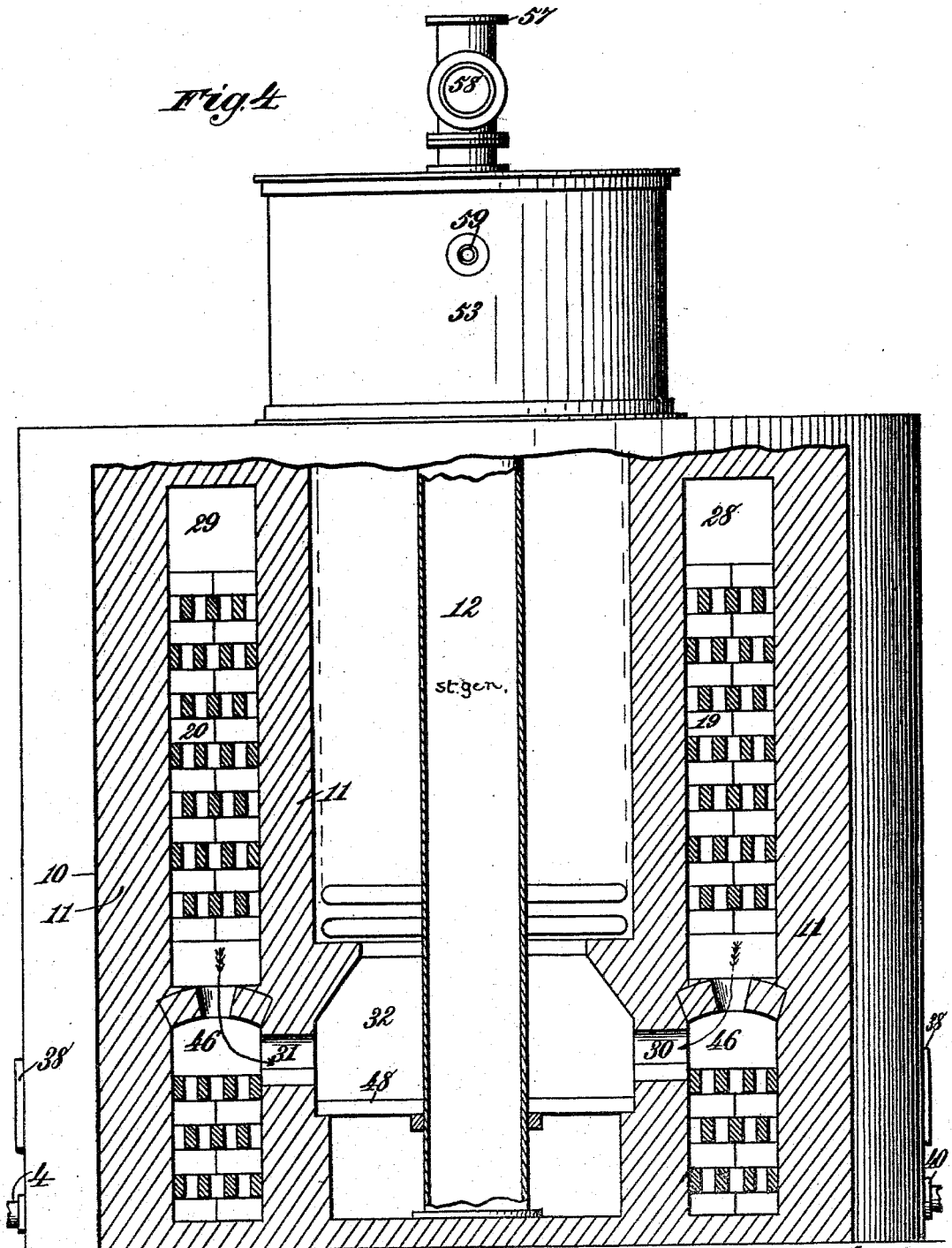

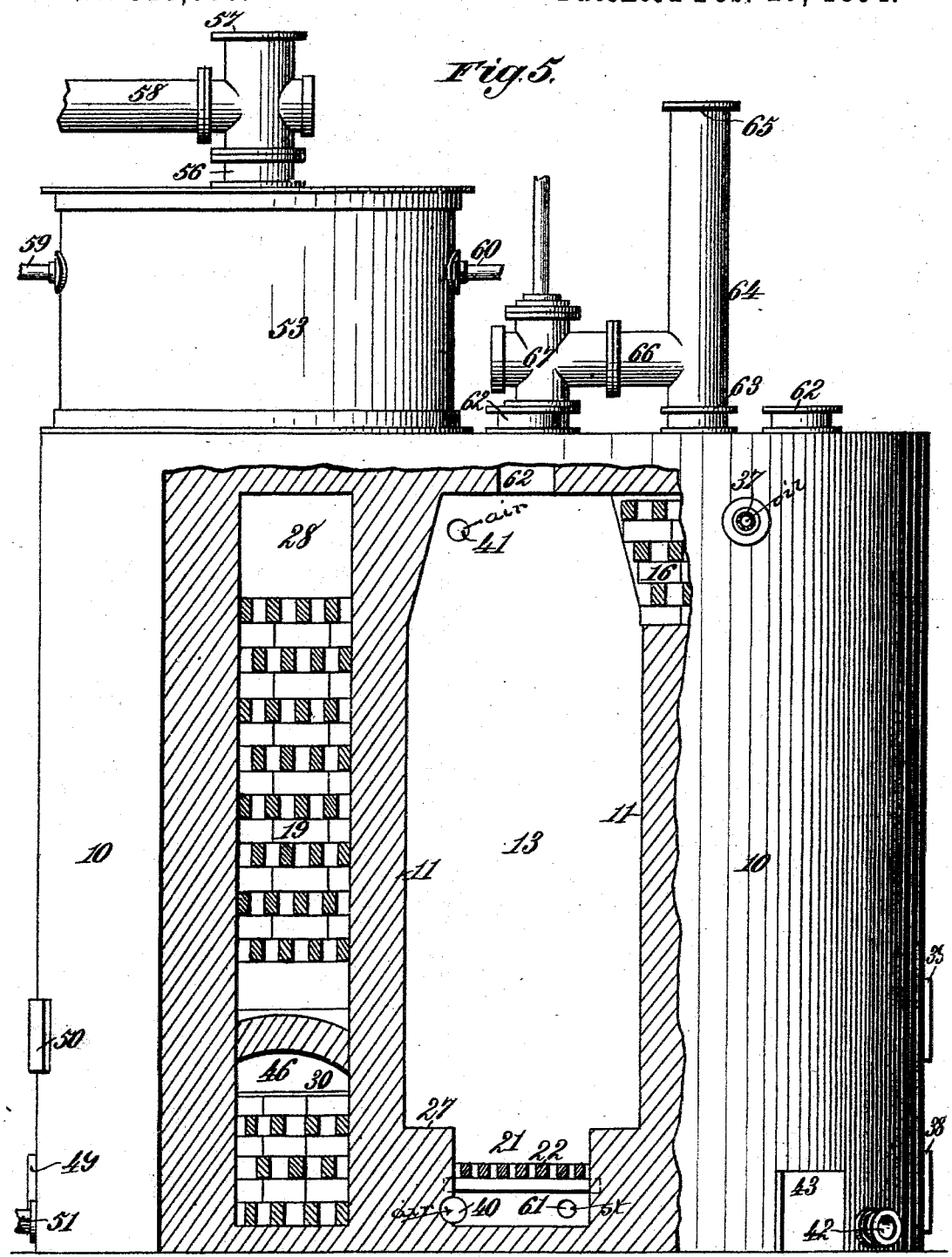

UNITED STATES PATENT OFFICE.

JOHN W. HAYES, OF NEW BRUNSWICK, NEW JERSEY.

APPARATUS FOR THE MANUFACTURE OF GAS.

SPECIFICATION forming part of Letters Patent No. 515,680, dated February 27, 1894.

Application filed July 26, 1893. Serial No. 481,566. (No model.)

*To all whom it may concern:*

Be it known that I, JOHN W. HAYES, a citizen of the United States, residing at New Brunswick, in the county of Middlesex and State of New Jersey, have invented new and useful Improvements in Apparatus for the Manufacture of Gas, of which the following is a specification.

My invention relates to the manufacture of fuel gas and illuminating gas from such materials as bituminous coal slack or run of mine and crude petroleum. I prefer these materials for the hydrocarbon contained in them and for their reduced cost when compared with coke, anthracite coal and naphtha. The last mentioned materials can, however, be used and in some instances a combination of all the different materials above named may be employed to great advantage.

In my manner of using bituminous slack with cheap oils I gain several important advantages which make themselves known in the improved quality and reduced cost of the manufactured gas. It is a fact well known to those skilled in the art of making gas (especially water gas) that the outlay for steam is an important item to be considered in getting at the cost of the gas at the station meter. One quarter of the coal used in water gas making is consumed in the steam generators in making the steam for decomposition in the carbon beds of the gas generators. This is ordinarily a great loss of material. Again, the amount of heat carried out of the gas generators by the gas and lost in the hydraulic main, wash box and scrubbers is another great source of loss; and, further, the heat carried out by the unburned gases and lost in the atmosphere while the apparatus is being heated up after each run of gas is another considerable source of loss. The combined loss of material and heat from these causes is a large item of expense that all gas makers are very anxious to reduce. With my improved gas making apparatus I am enabled to generate sufficient steam by burning the waste gases that are made when the coal beds are being heated up and by utilizing the heat of the good gases as they pass to the eduction pipe on the way to the gas holder. In order that I may do this in the most economical manner I place the gas generators, and carbureting and fixing chambers, together with the steam generator, in the same casing. I use two or more gas generating chambers in this casing and arrange them in such a manner with reference to the carbureting and fixing chambers that these latter chambers are heated to a great extent by the radiated heat from the combustion of the coal and from the heated gases passing through them and I, therefore, have most of the generator gas to burn in the steam generator for the production of steam to drive the blower engine and for decomposition in gas making; so that while gas is being made steam is maintained by the sensible heat of the red hot gases passing around or through the steam generator aided by the heat of the apparatus. The shell of the apparatus is lined with thick walls of refractory brick, with mineral wool between the brick and shell, so that a high heat surrounds the steam generator on all sides excepting a limited space in front, at fire and sight doors. I have the grates and fire doors so arranged that steam can be made direct from coal, independent of heat from the gas generating parts of the apparatus, as may be necessary when these parts are not heated up.

My invention consists in the features of construction and novel combinations of parts in a gas making apparatus as hereinafter more particularly described and claimed.

In the annexed drawings—Figure 1 is a sectional plan on the line 1—1, Fig. 3, of so much of a gas making apparatus as is necessary to illustrate my improvements. Fig. 2 is a central vertical section of the same on the line 2—2 of Fig. 1. Fig. 3 is a vertical transverse section on the line 3—3 of Fig. 1. Fig. 4 is a vertical transverse section on the line 4—4 of Fig. 1. Fig. 5 is a sectional side elevation on the line 5—5 of Fig. 1.

Referring to the several views, the number 10 designates an outer metallic shell, preferably of cylindrical form. This metallic shell has a heavy or greatly thickened fire brick lining 11, extensions of which are arranged to surround the steam generator 12, the gas generators 13, 14 and 15, the carbureting chambers 16 and 17 and the fixing chambers 18, 19 and 20, (as shown in Fig. 1.)

The grate boxes 21 of the several gas generators are made square or rectangular by so shaping the brick work inside the circular walls as to accommodate a square grate 22 upon which the coal will descend from the coal chambers constituting the upper part of the gas generators. In the gas generators 13 and 15 the grate boxes are alike or of the same size but the box in the central gas generator 14 is made much deeper (as will be seen by comparing Figs. 3 and 5) for the purpose of providing for side gratings of fire brick 23, Fig. 2, forming on each side a series of gas ducts 24, Fig. 1, through which gases may pass from the lower part of the generator into gas conduits 25, Figs. 1 and 3, leading to an arched chamber 26, Fig. 2, located beneath the checker work in the fixing chamber 18 and communicating therewith.

As shown in Figs. 1, 2, 3 and 5, the grate boxes 21 are each of less diameter than the body of a gas generator and come to an abrupt termination above the grate bars in such a manner as to form a broad ledge or base 27 by which the top of each grate box is surrounded. The object of this is to divide the weight of the coal between this ledge or base 27 and the grate 22 and to compel the air blast to go to the center of the charge instead of creeping up the sides between the brick wall and the coal. By this means, also, a better and quicker heating of the coal bed can be obtained with less liability to the formation of clinkers on the sides of the chamber walls.

The walls of the gas generating chambers are drawn in at the top, as shown in Figs. 3 and 5, for the purpose of providing for gas ways or conduits 28 and 29, one on each side of the steam generator. The gases passing up through the checker-work of the fixing chamber 18, to the top thereof, divide and one portion passes by the gas way 28, Figs. 4 and 5, to the top of the checkerwork in the fixing chamber 19, the other by the gas way 29, Figs. 1, 2 and 4, to the checkerwork of the fixing chamber 20. From the lower part of the fixing chambers 19 and 20 the hot gases pass through oppositely arranged passages 30 and 31, Fig. 4, to the lower part of a heating chamber 32 surrounding the steam generator.

The carbureting chambers 16 and 17 are placed one on each side of the central gas generator 14, one between the generators 13 and 14 and the other between the generators 14 and 15, as shown in Figs. 1 and 3. Each carbureting chamber is filled with fire brick, checkered, and resting on perforated or sectional arches 33, Figs. 2 and 3 built so as to allow the gases to pass up or down as desired. The checker brick of the carbureting chambers 16 and 17 is built out gradually from the supporting arches 33 into the upper part of the gas generating chamber 14, as shown in Fig. 3, thus contracting the coal bed to the same shape as in the chambers 13 and 15. The arches 33 may be keyed apart, as shown in Fig. 2, to provide for the passage of gas through or between them, or they may be constructed with central perforations 34, Fig. 3, for the same purpose. Beneath the arches 33 are chambers or passages 35 communicating with the gas generator. These carbureting chambers 16 and 17 each have an air inlet 36, Figs. 2 and 3, beneath them and an oil inlet or oil supply pipe 37, Figs. 1, 3 and 5, at or near the top.

By reference to Figs. 1 and 3 it will be seen that the fire brick lining 11 of the shell or casing 10 is very heavy and so designed as to save all the heat possible, allowing very little radiation. The extensions of this lining, forming the generator walls, are also very heavy and are joined to the outer lining by being built directly into the same. All the brick walls should be laid in such a manner as to prevent leakage of gases through them. They are braced by the brick in the several checker chambers in such a way that the working pressure does not affect them; and, so also, the wall surrounding the steam generator is braced in such manner that working pressure cannot affect it one way or the other.

The grate box of each gas generator is provided with a door 38, and the central generator 14 is provided in addition, with a door 39, Fig. 2, above the grate box, for the purpose of introducing bars to be placed across the top of the grate box to support the burden of coal while the side gratings 23 are being cleaned from accumulations of ashes and clinkers.

Each grate box 21 is provided with an air inlet 40, Figs. 1, 3 and 5, which is used when heating up the body of carbon in the gas generating chamber.

The gas generators 13 and 15 have air inlets 41, Fig. 5, above the body of coal in each chamber for the purpose of burning some of the generator gas to heat up the carbureting chambers. The central gas generator 14 has an additional lower air inlet 42, Fig. 1 on each side, one under each of the carbureting chambers. The air admitted through these side inlets enters about midway the body of coal and is used to burn the gases upward to heat the carbureting chambers or to burn downward to heat the body of coal, the action of which will be hereinafter more fully explained.

The gas conduits 25 have doors 43, Fig. 1, at their outer ends for giving access to clean out any solid material that may pass through the gas ducts 24 and collect under the perforated arch 44, Fig. 2, that supports the checker-work in the fixing chamber 18.

The fixing chambers 19 and 20 have doors 45, Fig. 1, opposite the archways 46 and passages 30, 31 Fig. 4, through which archways and passages said chambers 19 and 20 communicate with the heating chamber or furnace 32 surrounding the steam generator. The doors 45 are intended for use in placing or removing the checker brick arranged under arch-ways 46, and in the chambers 19 and 20 above.

The fixing chambers 19 and 20 have air inlets 47, Fig. 1, at the bottom of each. The air is forced through these inlets into the checkerwork below the archways 46, Fig. 4, of the fixing chambers and is heated by the hot brick which results in a decided advantage in igniting the gases as they pass through the openings or arched passages 30 and 31 into the chamber 32 surrounding the steam generator.

The steam generator heating chamber or furnace 32 is provided with a grate 48, Figs. 1, 2 and 4, it has also an ash pit door 49 and two doors 50, Figs. 1 and 2 that are arranged immediately above the grate bars.

An air inlet 51 Figs. 1 and 5, is provided for the purpose of supplying air for combustion in first starting the apparatus or when the steam generator is to be used before the gas generators are started.

The walls inclosing the steam generator 12 are extended upward beyond the walls of the gas generators, as will be seen by reference to Fig. 2.

To the top metallic casing 52 of the gas generators is fitted a special casing 53, also of metal, extended over the top of the steam generator walls and secured in place by angle irons 54, as shown. The steam generator has its upper end inclosed in this special casing 53 with the fire brick wall reaching to the top and arched over with fire brick. An opening is left in the center of the arch 55 for the products of combustion and the manufactured gas to pass out, the former into the air through a vertical pipe 56 and open relief valve 57 and the latter through a horizontal branch pipe 58 to the gas holder, when the relief valve is closed.

The steam generator 12 may be of the upright tubular type shown in the drawings, but I would have it understood that I do not confine myself to this form nor to any other particular construction.

Two steam pipes 59 and 60, Figs. 2 and 5, pass out from the steam generator through the surrounding brick wall and metal casing. One of these pipes should connect with a blow off valve and indicator, not shown, and the other is designed to connect with suitable branch pipes, not shown, for supplying steam to an engine and pumps, if needed, and to injectors that may be used with the oil supply pipes 37; and also for supplying steam to the gas generators through suitable openings, as 61 Figs. 2 and 5, at the bottom of the several grate boxes.

Coal is fed to the different gas generators 13, 14, and 15, through coal feeders of any approved pattern which are to be securely bolted to inlet branches or pipes 62, Figs. 2 and 5, at the tops of the generators.

The gas generator 14 has on its top, in addition to the coal feeder branch 62, a branch outlet 63 for gases. This branch gas outlet 63, Figs. 2, 3, and 5, can as well be placed over one of the carbureting chambers, in any convenient place. It has a vertical pipe 64 fitted with a relief valve 65 on its upper end, and from this vertical pipe is extended a horizontal pipe 66 connecting with a stop valve 67 communicating with the top of the fixing chamber 18 as shown in Fig. 2. The relief valve 65 is only used when the different grate boxes are cleaned of ashes, the pipe 64 acting then as a chimney to draw off the gases from the chambers below. The valve is closed while the apparatus is in use for making gas. It may be partly opened, when fires have been banked for a long time, to facilitate combustion but the opening of the relief valve 57 on the top of the steam generator will generally accomplish the same result except when the fires have not been cleaned for a long time. The stop valve 67 is of the ordinary construction and is bolted to a short branch pipe communicating with the fixing chamber 18 and when opened makes a passage way for gases from the gas generators and from the carburetors direct to the top of said fixing chamber whence the gases can pass by the gas ways 28 and 29 to the tops of the fixing chambers 19 and 20 and thence down to the passages 30 and 31 leading into the heating chamber 32 surrounding the steam generator. This makes almost a direct route for the generator gases to pass to the steam generator from the coal beds in the gas generators and is used when the generator 14 or fixing chamber 18, is in danger of becoming overheated by excessive blasting before the other gas generators are heated up ready for gas making. The closing of the stop valve 67 compels all the gases to pass through the carbureting chambers 16 and 17 and down through the coal in the lower half of the gas generator 14 to the side gratings 23, thence through the gas ducts 24 and conduits 25 to the bottom of the fixing chamber 18 and thence up through said chamber to the gas ways 28 and 29 leading into the fixing chambers 19 and 20, at the top.

If it is desired to heat the checker brick work in the fixing chamber 18 the air blast under the grate of the gas generator 14 is turned on and the air meeting the gases and passing therewith through the side gratings 23 causes the gases to burn in the chamber 26, Fig. 2, under the arch 44 supporting the checkerwork, the space or chamber 26 thus serving as a combustion chamber through which the bricks may be heated up to any desired temperature. This, however, is necessary only when the apparatus is being first heated up after standing idle for sometime and becoming cooled down. In the regular running of the apparatus the hot gases passing through the gas generator 14 are sufficient, together with the accumulating heat in the apparatus, to keep the checker brick at the proper temperature for fixing the gases.

It is an important feature of this apparatus that the opening and closing of the stop valve 67 changes the direction of the flow of gases.

For instance, if the stop valve 67 is closed and the side air inlets 42 opened air will pass into the coal in the gas generator 14 through the inlets 36 from under the arches of the carbureting chambers; a combustion of coal commences; the products of combustion pass downward to the grate box, thereby heating the lower half of the coal body by direct combustion; and all the products from the combustion going on in the gas generators 13 and 15 pass therefrom through the carbureting chambers 16 and 17 and thence down through the coal in the gas generator 14 and out through the gratings 23 together with the products generated in and passing from the gas generator 14. Now if the stop valve 67 is opened without stopping the flow of air through the inlets 42, the current of gases of combustion is immediately changed in direction. The gases from the coal in the generator 14 will be burned by the air admitted through the inlets 42 and the brick in the carbureting chambers 16 and 17 will be heated up. The products of combustion from the gas generators 13 and 15 will meanwhile, go almost direct as hereinbefore described to the chamber 32 surrounding the steam generator, to be burned for heating purposes in generating steam. It is to be noted, however, that in whatever direction the heating is being done the products of combustion all pass eventually to the steam generator. The management of the apparatus in this way secures a partial fixing of the gases by the heat of the burning coal in the gas generator 14 without attempting to force the gases through the crust or bridge that always forms on the surface of a burning body of bituminous coal. I get at the middle of the coal body from both sides, under the bridge, and I am enabled by means of the side gratings 23 to pass the gases easily down through the body of coal without encountering any back pressure. By arranging the carbureting chambers 16 and 17 so as to communicate with the gas generators 13, 14 and 15 between the tops of the several coal beds I am enabled to draw the gases from two sides, carburet them separately and pass them together through the coal in the central generator 14 to the fixing chambers; and at the same time the coal gases rising from the bituminous coal beds and passing through the checkerwork of the carbureting chambers will be mixed therein with oil gases and unite in the formation of a gas having high heating quality and high illuminating value because of the high percentage of heavy hydrocarbons that it carries.

The checker brick in the carbureting chambers is supported on strong arches made from brick or tiling of considerable length so that the checkerwork will be adequately sustained in the building outward to contract the space in the upper portions of the gas generating chambers. I find that checkerbrick when properly set will resist the pressure of a body of coal in position in the generators; and that gases rising from the coal can be passed through the interstices of the checkerwork and then down through the lower strata of the same bed of coal, and when cooled and scrubbed will make little or no tar. That is to say, bituminous coal gases rising from the coal distilling above the bridge or crust will by this apparatus be conducted through the heated checkerbrick to a point near the grate, then through the heated coal to the grate and then again through heated checker brick work; and may be cooled and scrubbed with the formation of little or no tar and with the further result of giving a high percentage of hydrocarbon gases. Another important point gained by having the carbureting chambers in the side walls of the generators is that the apparatus need not be so high as ordinarily required, this advantage being aided also by a similar arrangement of the fixing chambers without diminishing their required extent of surface.

In using bituminous coals more air can be used and larger surfaces heated because of the large percentage of hydrocarbon in the generator gas, burning with a long yellow flame instead of the short blue flame of generator gas when anthracite coal and coke are employed in water gas making. I find that the bridging or crust formed on the bituminous coal may be utilized to great advantage in the manner above described and that what has heretofore been considered impracticable by most gas engineers, namely the use of bituminous slacks in the manufacture of illuminating gas, is thus made easy.

Operation: Having described the various parts of the gas making apparatus so far as they relate to my improvements, I will now explain how it is to be used in making gas, when starting with a cold apparatus that needs preliminary heating up. All doors and valves are first to be closed and being self sealing all external air is practically excluded. Steam must first be raised to run the blower engine. This is done by starting a fire on the grate of the steam generator, the boiler being supplied with water and the relief valve 57 being opened to provide for a draft, the ash pit door being also opened to admit air to the grate of the steam generator. All other doors and valves remain closed for the present. After this fire is well under way and the walls of the steam generator become heated then other fires may be started in the grate boxes of the different gas generators the smoke being allowed to pass out at the relief valve 65 which will now be opened. When the walls of the gas generators get sufficiently heated the relief valve 65 will be closed and all the gas and products of combustion sent to the chamber 32, surrounding the steam generator, to be burned in keeping up the making of steam. Air is admitted to burn this gas by slightly opening the doors 45 at the bottom of the fixing chambers 19 and 20 which communicate through the openings or passages 30 and 31 with the combustion chamber 32 of the steam generator. When enough steam is raised to start the blower air is first turned on at the air inlet 51 and the ash pit door 49 is closed. The doors at the bottom of the fixing chambers 19 and 20 are then closed and sealed. Air is then turned on at the inlets 47 under the chambers 19 and 20 and at the inlets 40 under the grates of the gas generators. The stop valve 67 is opened and all the generator gases given the shortest course to the steam generator. When steam is well under way the admission of air under the grate of the steam generator is cut off, the heated generator gases from the coal beds being now sufficient to keep up steam. The upper air inlets 41 to the gas generators 13 and 15 are now opened, the stop valve 67 is closed and the gases will now pass down through the carbureting chambers 16 and 17 where they will meet the side air currents admitted through the openings 36 by opening the outer inlet pipes 42. The burning then continues down through the coal in the gas generator 14 to the side gratings 23 where the current from the air blast under the grate is met and the burning of gases continued outward under the arch 44 in the bottom of the fixing chamber 18. This arch being perforated or sectional the heated products of combustion will pass upward through the checker brick in the chamber 18, thereby heating them and also the brick in the communicating chambers 19 and 20. This is continued until the checkerwork in the chamber 18 has reached a good red heat. The stop valve 67 is then opened and the gases change direction and pass to the tops of the chambers 19 and 20, heating the checkerwork therein. The pipes or passages conducting these hot gases from the generators to the checker chambers may be made large enough to admit a suitable fire brick lining. The opening and closing of the stop valve 67 and the changing of the current of gases is to be continued until the entire apparatus is heated throughout. This may require considerable time for the first heating but after that from eight to fifteen minutes will be sufficient. Gas making is commenced by shutting all air inlet valves, closing all relief valves and the stop valves 67, turning on one steam inlet, under the gas generator 15 and opening the oil supply pipe to the carbureting chamber 17, letting them run for a minute or so to note the temperature of the apparatus by the quality of gas at a test burner and the character of the overflow at the seal pot. If no lamp-black appears on the water in the seal pot at the beginning of the first run, then steam may be turned on under the grate of gas generator 13 and the oil supply pipe to carburetor 16 be opened. The steam and oil are allowed to flow until the temperature throughout the apparatus becomes reduced below the point required for successful and economical gas making, or until the coal beds cease to properly decompose steam. Then the oil supply is to be cut off and the steam valves closed. Air is now to be turned on under the grates of the gas generators, the stop valve 67 opened and also the relief valve 57 over the steam generator. Air is also to be admitted at the bottom of the checker chambers 19 and 20, as before described, to burn the gases to heat the steam generator, and also through the side air inlets 42 leading to the central generator. The flow of generator gas is continued in this direction for from three to five minutes, after which the stop valve 67 will be closed and the direction of gases changed down through the carburetors and through the coal in the generator 14; and at the same time the air inlets 41 to the tops of the generators 13 and 15 will be again opened, so as to properly heat up those portions of the apparatus. The flow of generator gas will be continued in its changed direction for, say, three to five minutes and then stop valve 67 will be again opened and the flow of gas changed back to the checker chambers 19 and 20 in the former direction. A minute or two running now brings the proper temperature all around and gas making may be again commenced in the manner above explained. During the periods of gas making the highly heated gases passing through or around the steam generator serve to hold up the pressure of steam and together with the heat stored in the apparatus make it self sustaining after the apparatus has once been properly heated throughout.

What I claim as my invention is—

1. In an apparatus for making gas, the combination of two or more gas generators having grate boxes of reduced diameter surrounded at the top by ledges, the grate box of one of said generators being deeper than the others and provided with side gratings located above the grate, a checkerwork carbureting chamber built into the upper portions of the walls between two gas generators and communicating with each, a steam generator heating chamber having a gas eduction pipe leading therefrom, a fixing chamber communicating at its lower end with the side gratings of the grate box in one of the gas generators, gas ways or passages leading from the upper portion of the fixing chamber to the steam generator heating chamber, and a stop valve for controlling communication between the top of one of the gas generators and the top of said fixing chamber, substantially as described.

2. In an apparatus for making gas, the combination of two or more gas generators, a checkerwork carbureting chamber built into the upper portions of the walls between two gas generators and communicating with each, and a gas fixing chamber communicating at the bottom with the lower portion of one of the gas generators, whereby gas from the top of one generator may be allowed to pass through the carburetor down to the center of a deep body of bituminous coal in the other generator, penetrating it below the bridge or line of crust, thereby gaining a passage for the gases through the said body of coal below said crust or bridge, substantially as described.

3. In an apparatus for making gas, the combination of a steam generator heating chamber provided with a gas eduction pipe, a series of gas generators having grate boxes provided with inlets for air and steam, carbureting chambers provided with oil supply pipes and located in the walls and between the gas generators and communicating with each, and a series of fixing chambers located between the gas generators and the steam generator and communicating with each other at the top, the bottom of the central fixing chamber being in communication with the lower portion of the central gas generator and the lower portions of the outermost fixing chambers being in communication with the lower portion of the steam generator heating chamber, substantially as described.

4. In an apparatus for making gas, the combination of a steam generator heating chamber provided with a gas eduction pipe, a gas generator, an intermediate fixing chamber communicating at the top with the steam generator heating chamber and at the bottom with the gas generator, and a connecting pipe and stop valve by which gases may be conducted from the top of the gas generator to the top of the fixing chamber and thence to the heating chamber of the steam generator to be burned, substantially as described.

5. In an apparatus for making gas, the combination of a steam generator heating chamber having a vertical pipe leading therefrom and provided at the top with a relief valve, a gas eduction pipe leading from said vertical pipe below the relief valve, a gas generator, a fixing chamber intermediate the steam generator and gas generator and communicating at the bottom with the lower portion of the gas generator and at the top with the lower portion of the steam generator heating chamber, a vertical pipe leading from the top of the gas generator and provided with a relief valve, and a pipe provided with a stop valve for controlling communication between the top of the gas generator and the top of the fixing chamber, substantially as described.

6. In an apparatus for making gas, the combination of a series of gas generators provided with grate boxes, the grate box of the central generator being deeper than the others and provided with side gratings above the grate, a fixing chamber, gas ducts and conduits connecting the side gratings of the central gas generator with the lower portion of the fixing chamber, checkerwork carbureting chambers built into the walls between the upper portions of the gas generators and communicating with each, two air blasts leading under said carbureting chambers into the central gas generator on each side of the coal, whereby the coal can be heated downward and the checkerbrick heated upward, and a stop valve controlling communication between the top of the central gas generator and the top of the fixing chamber and adapted to be opened or closed to change the heating from one direction to the other, substantially as described.

7. In an apparatus for making gas, the combination of a steam generator having a surrounding heating chamber provided with a relief valve and gas eduction pipe, a series of gas generators, carbureting chambers located in the walls and between the upper portions of the gas generators and communicating with each, air blasts leading into opposite sides of the central portion of the central gas generator at the bottoms of the carburetors, air inlets at the tops of the outer gas generators, a series of fixing chambers communicating with each other at the top, the lower portion of the central fixing chamber being in communication with the lower portion of the central gas generator and the lower portions of the outermost fixing chambers being in communication with the steam generator heating chamber, a stop valve controlling communication between the top of the central gas generator and the top of the central fixing chamber, and a metallic casing and fire brick lining surrounding said generators and chambers, substantially as described.

In testimony whereof I have hereunto set my hand in presence of two subscribing witnesses.

JOHN W. HAYES.

Witnesses:
WILLIAM J. SLOAN,
WILLIAM O. BEGLEY.